(12) United States Patent
Zander et al.

(10) Patent No.: US 8,592,517 B2
(45) Date of Patent: Nov. 26, 2013

(54) MOISTURE-CURING FORMULATIONS WITH TIME-MODIFIED PHASES

(75) Inventors: Lars Zander, Neuötting (DE); Pavel Gentschev, Bad Goisern (AT)

(73) Assignee: Henkel AG & Co. KGaA, Duesseldorf (DE)

( * ) Notice: Subject to any disclaimer, the term of this patent is extended or adjusted under 35 U.S.C. 154(b) by 0 days.

(21) Appl. No.: 13/460,129

(22) Filed: Apr. 30, 2012

(65) Prior Publication Data

US 2012/0277373 A1 Nov. 1, 2012

Related U.S. Application Data

(63) Continuation of application No. PCT/EP2010/066349, filed on Oct. 28, 2010.

(30) Foreign Application Priority Data

Oct. 30, 2009 (DE) .......................... 10 2009 046 268
Jan. 6, 2010 (DE) .......................... 10 2010 000 705

(51) Int. Cl.
  *C08L 75/04* (2006.01)
  *C09D 175/04* (2006.01)
  *C09J 175/04* (2006.01)
  *C08G 18/83* (2006.01)

(52) U.S. Cl.
  USPC ......................................... 524/590; 525/452

(58) Field of Classification Search
  None
  See application file for complete search history.

(56) References Cited

U.S. PATENT DOCUMENTS

| | | |
|---|---|---|
| 2,866,774 A | 12/1958 | Price |
| 3,635,906 A | 1/1972 | Jawawant |
| 3,895,149 A | 7/1975 | Sheffler et al. |
| 4,322,327 A | 3/1982 | Yoshimura et al. |
| 4,395,528 A | 7/1983 | Leiner et al. |
| 4,474,836 A | 10/1984 | Lukoschek et al. |
| 4,611,044 A | 9/1986 | Meyer et al. |
| 4,871,854 A | 10/1989 | Oberth et al. |
| 5,474,827 A | 12/1995 | Crandall et al. |
| 6,084,026 A | 7/2000 | Jamasbi |
| 6,124,380 A | 9/2000 | Bossert et al. |
| 6,503,995 B2 * | 1/2003 | Tsuji et al. ...................... 528/31 |
| 6,914,110 B2 * | 7/2005 | Tsuji et al. ...................... 526/222 |
| 7,351,782 B2 * | 4/2008 | Wakabayashi et al. ......... 528/18 |
| 7,550,547 B2 * | 6/2009 | Wakabayashi et al. ......... 528/15 |
| 7,807,756 B2 * | 10/2010 | Wakabayashi et al. ....... 525/374 |
| 7,834,123 B2 | 11/2010 | Suen |
| 7,910,682 B2 * | 3/2011 | Okamoto et al. ............... 528/25 |
| 7,998,919 B2 * | 8/2011 | Rong et al. .................... 510/466 |
| 2002/0115770 A1 | 8/2002 | Georgeau et al. |
| 2005/0171315 A1 * | 8/2005 | Wakabayashi et al. ........ 528/26 |
| 2006/0047063 A1 * | 3/2006 | Schaub et al. ................ 524/588 |
| 2006/0069225 A1 | 3/2006 | Wintermantel et al. |
| 2006/0180274 A1 | 8/2006 | Burckhardt et al. |
| 2006/0287408 A1 * | 12/2006 | Baikerikar et al. ............. 522/71 |
| 2007/0270567 A1 | 11/2007 | Suen |
| 2009/0145067 A1 | 6/2009 | Tatley et al. |
| 2009/0247720 A1 | 10/2009 | Wang et al. |
| 2010/0041810 A1 * | 2/2010 | Wakabayashi et al. ....... 524/425 |
| 2013/0078473 A1 | 3/2013 | Kollbach et al. |

FOREIGN PATENT DOCUMENTS

| | | |
|---|---|---|
| DE | 1956672 | 6/1970 |
| DE | 108103 | 9/1974 |
| EP | 549210 | 6/1993 |
| EP | 520426 | 4/1996 |
| EP | 1288247 | 3/2003 |
| EP | 1591488 | 11/2005 |

OTHER PUBLICATIONS

International Search Report issued in connection with International Patent Application No. PCT/EP2010/066349 mailed Jun. 8, 2011.
Database Registry [Online] Chemical Abstracts Service, Columbus, Ohio, US, Nov. 16, 1984 "Tinuvin 327", XP002629922.
Database Registry [Online] Chemical Abstracts Service, Columbus, Ohio, US, Nov. 16, 1984 "Tinuvin 328", XP002629923.
Database Registry [Online] Chemical Abstracts Service, Columbus, Ohio, US, Nov. 16, 1984 "U-220", XP002629924.
Standard Test Methods for Polyurethane Raw Materials: Determination of Unsaturation of Polyols1.
International Search Report issued in connection with International Application No. PCT/US2011/035454 mailed Feb. 8, 2012.
Li L. and Xu B.: Synthesis and characterization of 5-substituted 8-hydroxyquinoline derivatives and their metal complexes; tetrahedron 64, pp. 10986-10995 (2008).

\* cited by examiner

*Primary Examiner* — Robert S Loewe
(74) *Attorney, Agent, or Firm* — James E. Piotrowski; Steven C. Bauman

(57) ABSTRACT

The invention aims to allow a curable composition to have an extended working phase followed by a short time period in which said compound becomes fully cured. This is achieved by the provision of a curable composition comprising the following components: a) at least one polyether and/or at least one polyacrylic acid ester with at least one reactive silyl group as an end-group; b) at least one organotin compound; and c) at least one compound that does not contain any tin or silicon atoms and that has at least two functional groups. Said groups are selected from the following: carboxy, carbonyl or hydroxy groups, or nitrogen atoms that are part of a ring system with aromatic character. In addition, the invention relates to a method for producing such a composition, and to the use thereof as an adhesive, a sealant or as a coating material.

11 Claims, No Drawings

MOISTURE-CURING FORMULATIONS WITH TIME-MODIFIED PHASES

The invention relates to compositions based on silyl-terminated polymers. In particular, the invention relates to compositions of this type having delayed curing, methods for the production thereof and the use thereof in adhesives, sealants and coating compositions.

One-component, moisture-curing adhesives and sealants have, for many years, played an important role in numerous technical applications. In addition to the polyurethane adhesives and sealants having free isocyanate groups and the traditional silicone adhesives and sealants based on dimethylpolysiloxanes, there has also been increasing use recently of the so-called silane-modified adhesives and sealants. Compared with the polyurethane adhesives and sealants, the silane-modified adhesives and sealants have the advantage that they are free from isocyanate groups, particularly from monomeric diisocyanates. Furthermore, they are distinguished by a broad range of adhesion on a variety of substrates without surface pretreatment by primers.

Polymer systems that possess reactive silyl groups are thus known in principle. In the presence of atmospheric moisture, polymers that have silyl groups with hydrolyzable substituents are able to condense with each other even at room temperature, eliminating the hydrolyzed residues. Depending on the content of silyl groups having hydrolyzable substituents and the structure of these silyl groups, mainly long-chain polymers (thermoplastics), relatively wide-meshed, three-dimensional networks (elastomers) or highly crosslinked systems (thermosets) are formed during this process. The polymers typically have an organic backbone which, for example, carries alkoxy or acyloxy silyl groups at the ends. The organic backbone can be, for example, polyurethanes, polyesters, polyethers etc.

In order to enable rapid curing of the compositions after bonding, curing catalysts which are usually metal organyls, for example based on tin or iron, are generally added to the formulations. On the one hand, the rapid curing of the compositions is desirable so that a stable bond between two substrates can be produced quickly. On the other hand, fast-curing systems offer only a short processing period and thus only brief opportunities for correction immediately after application, which in some cases is too demanding for users. It is desirable, therefore, to provide an appropriate processing period with subsequent rapid curing.

DE-OS 1956672 describes multi-component adhesives based on polyisocyanates and polyhydroxy compounds, to which an organotin cure rate catalyst and a time-lapse modifier from the group of β-dicarbonyl compounds, α-hydroxy ketones, fused aromatic β-hydroxy ketones and nitrogen-heterocyclic, fused aromatic β-hydroxy compounds have been added. Such compositions may, however, display disadvantages in certain properties, for example in terms of the range of adhesion or the elastic properties.

EP 0549210 A2 describes thermoformable compositions which contain polymers with hydrolyzable silyl groups, by means of which a post cure is achieved following thermoforming. The polymers are polyolefins into which olefinically unsaturated silanes are polymerized. In order to prevent embrittlement prior to thermoforming, in addition to the silane condensation catalyst, a functional organic compound is added which, in addition to at least one hydroxy group, has at least one amino or carboxy group. The compositions of EP 0549210 A2 result in molded articles, such as e.g. cable sheaths, and are not suitable as adhesives or sealants in particular because of their low elasticity.

There is therefore a need for adhesives, sealants and coating compositions which combine a broad range of adhesion and good elasticity values with other advantageous properties. The object of the present invention is therefore to provide a curable composition, which forms the basis of adhesives, sealants and coating compositions with a broad range of adhesion and good elasticity values, and a user-friendly, extended processing phase followed by the shortest possible time to achieve complete cure.

The solution to the problem according to the invention can be taken from the claims. It consists essentially of a curable composition encompassing as components a) at least one polyether and/or at least one polyacrylic acid ester having at least one terminal group of the general formula (I)

$$-A_n\text{-R—SiXYZ} \quad \text{(I), in which}$$

A is a divalent linking group,
R is a divalent hydrocarbon residue having 1-12 C atoms optionally containing a heteroatom, and
X, Y, Z are, independently of one another, $C_1$-$C_8$ alkyl, $C_1$-$C_8$ alkoxy or $C_1$-$C_8$ acyloxy residues, at least one of the residues being a $C_1$-$C_8$ alkoxy or $C_1$-$C_8$ acyloxy group, and
n is 0 or 1; and
b) at least one organotin compound,
c) at least one compound which is free from tin and silicon atoms and has at least two functions that are each selected from: carboxy groups, carbonyl groups, hydroxy groups and nitrogen atoms which are part of a ring system that is aromatic in nature.

Such a composition exhibits excellent adhesion to a wide variety of substrates, makes highly elastic bonds possible owing to its very good elasticity after curing and allows the user sufficient time to make corrections after application in that it has a prolonged skin-over time, but after this its complete cure is accelerated. The bonds produced with such a composition therefore exhibit good strength values after curing, which indicate a stable and resilient bond.

According to the invention, a curable composition is preferred which encompasses as components a) at least one polyether and/or at least one polyacrylic acid ester having at least one terminal group of the general formula (I)

$$-A_n\text{-R—SiXYZ} \quad \text{(I), in which}$$

A is a divalent linking group,
R is a divalent hydrocarbon residue having 1-12 C atoms optionally containing a heteroatom, and
X, Y, Z are, independently of one another, $C_1$-$C_8$ alkyl, $C_1$-$C_8$ alkoxy or $C_1$-$C_8$ acyloxy residues, at least one of the residues being a $C_1$-$C_8$ alkoxy or $C_1$-$C_8$ acyloxy group, and
n is 0 or 1; and
b) at least one organotin compound,
c) at least one compound which is free from tin and silicon atoms and has at least two functions that are each selected from: carboxy groups, carbonyl groups, hydroxy groups and nitrogen atoms which are part of a ring system that is aromatic in nature, the ring system that is aromatic in nature containing a nitrogen atom as the only heteroatom.

Particularly preferred is a curable composition encompassing as components a) at least one polyether and/or at least one polyacrylic acid ester having at least one terminal group of the general formula (I)

$$-A_n\text{-R—SiXYZ} \quad \text{(I), in which}$$

A is a divalent linking group,

R is a divalent hydrocarbon residue having 1-12 C atoms optionally containing a heteroatom, and X, Y, Z are, independently of one another, $C_1$-$C_8$ alkyl, $C_1$-$C_8$ alkoxy or $C_1$-$C_8$ acyloxy residues, at least one of the residues being a $C_1$-$C_8$ alkoxy or $C_1$-$C_8$ acyloxy group, and n is 0 or 1; and b) at least one organotin compound, c) at least one compound which is free from tin and silicon atoms and has at least two functions, of which one is selected from: carboxy groups, carbonyl groups, hydroxy groups and is preferably a hydroxy group, and the second is either a nitrogen atom which is part of a ring system that is aromatic in nature, the ring system preferably containing a nitrogen atom as the only heteroatom, or a carboxy group.

A curable composition is understood to be a substance or a mixture of multiple substances which is curable by physical or chemical measures. These chemical or physical measures can consist, for example, in the supply of energy in the form of heat, light or other electromagnetic radiation, but also in simply bringing into contact with atmospheric moisture, water or a reactive component.

A polyether is understood to be a polymer whose organic repeating units contain C—O—C ether functionalities in the main chain. Thus, the polyethers do not include polymers having lateral ether groups, such as e.g. cellulose ethers, starch ethers and vinyl ether polymers. Likewise polyacetals, such as polyoxymethylene (POM), are generally not included in the polyethers.

A polyacrylic acid ester is understood to be a polymer based on acrylic esters, which therefore has as a repeating unit the structural motif —$CH_2$—CH(COOR)—, wherein R denotes linear, branched, cyclic and/or functional substituent-containing alkyl residues, for example methyl, ethyl, isopropyl, cyclohexyl, 2-ethylhexyl or 2-hydroxyethyl residues.

The composition according to the invention preferably contains a polyether in component a). Polymers which contain polyether as backbone have a flexible and elastic structure not only at the end groups but also in the polymer backbone. Thus, compositions can be produced which have excellent elastic properties. Polyethers are not only flexible in their backbone but also strong. Thus, for example, they are not attacked or decomposed by water and bacteria. Within the framework of the present invention, from the point of view of availability, polyethers based on polyethylene oxide and/or polypropylene oxide are particularly preferably used in component a).

Preferably, component a) contains at least one alkoxy- and/or acyloxysilane-terminated polyether having a molecular weight $M_n$ of 4,000 to 100,000, preferably 8,000 to 50,000, particularly preferably 10,000 to 30,000 and in particular 15,000 to 25,000 g/mol. The molecular weight $M_n$ is understood as the number average molecular weight of the polymer. Within the meaning of the present invention, the number average molecular weight $M_n$ as well as the weight average molecular weight $M_w$ is determined by gel permeation chromatography (GPC) using polystyrene as the standard. Such a method is known to the person skilled in the art. The molecular weights given are particularly advantageous, since the corresponding compositions have a balanced ratio of viscosity (ease of processing), strength and elasticity. This combination is very advantageously pronounced in a molecular weight range ($M_n$) of from 12,000 to 20,000, in particular from 14,000 to 18,000.

Preferably in the context of the present invention, at least one polyether is contained in component a) wherein the $M_w/M_n$ ratio is less than 1.5. The $M_w/M_n$ ratio, which is also called polydispersity, indicates the width of the molecular weight distribution and thus of the different degrees of polymerization of the individual chains for polydisperse polymers. For many polymers and polycondensates, a value of about 2 applies to the polydispersity. Strict monodispersity would exist at a value of 1. The polydispersity of less than 1.5 which is preferred within the framework of the present invention indicates a relatively narrow molecular weight distribution and thus the specific nature of properties related to the molecular weight, such as e.g. viscosity. Particularly preferably, at least one alkoxy- and/or acyloxysilane-terminated polyether of component a) has a polydispersity ($M_w/M_n$) of less than 1.3.

The polyether(s) preferably used in component a) are furthermore preferably distinguished by a low number of double bonds at the ends of the polymer chain. This so-called terminal unsaturation results from an undesired side reaction in the polymerization of low molecular weight diols with alkylene oxides. The result is a certain proportion of monohydroxy polyethers, which can be silylated at only one end of the chain and accordingly also crosslink only via one end of the chain. This has disadvantageous effects on the functionality of the polyethers and of the compositions produced therefrom. Polyethers with a low number of terminal double bonds can be produced, for example, by so-called double metal cyanide catalysis (DMC catalysis). Preferably, component a) contains at least one polyether having a terminal unsaturation of less than 0.07 meq/g, determined by the method ASTM D4671.

The polyether(s) and/or polyacrylic acid ester(s) of component a) has/have at least one end group of the general formula (I)

$$-A_n\text{-R—SiXYZ} \qquad (I).$$

A divalent or bivalent linking group A here is understood as a divalent chemical group that links the polymer skeleton of the alkoxy- and/or acyloxysilane-terminated polymer with the residue R of the end group. The divalent linking group A can, for example, be formed during production of the alkoxy- and/or acyloxysilane-terminated polyether and/or polyacrylic acid ester polymer, for example as a urethane group by the reaction of a polyether functionalized with hydroxy groups with an isocyanatosilane. In this case, the bivalent linking group can be either distinguishable or indistinguishable from structural features occurring in the underlying polymer skeleton. The latter is the case, for example, if it is identical with the linkage points of the repeating units of the polymer skeleton.

A is preferably an amide, carbamate, urea, imino, carboxylate, carbamoyl, amidino, carbonate, sulfonate or sulfinate group or an oxygen or nitrogen atom. The linking group A can be formed during the production of the silyl-terminated polymers by reacting the skeleton polymer with a reactive compound carrying the —R—SiXYZ sequence.

Particularly preferred as linking group A are urethane and urea groups which can be obtained by reaction of specific functional groups of a prepolymer with an organosilane which carries a further functional group. Urethane groups can be formed, for example, when either the polymer skeleton contains terminal hydroxy groups and isocyanatosilanes are used as a further component, or conversely if a polymer having terminal isocyanate groups is reacted with an alkoxysilane containing terminal hydroxy groups. Similarly, urea groups can be obtained when a terminal primary or secondary amino group is used—either on the silane or on the polyether and/or polyacrylic acid ester—which reacts with a terminal isocyanate group present in the respective reactant. This means that either an aminosilane having a terminal isocyanate group-containing polyether and/or polyacrylic acid ester or a terminal amino group-substituted polyether and/or polyacrylic acid ester is reacted with an isocyanatosilane. Urethane and urea groups advantageously increase the strength of the polymer chains and of the entire crosslinked polymer.

n is 0 or 1, i.e. the divalent linking group A links the polymer backbone to the residue R (n=1) or the polymer skeleton is bonded or linked directly to the residue R (n=0). The residue R is a divalent hydrocarbon residue having 1 to 12 carbon atoms, optionally containing a heteroatom. As a heteroatom, for example oxygen (O) or nitrogen (N) can be contained. The hydrocarbon residue can be, for example, a straight-chain or branched or cyclic, substituted or unsubstituted alkylene residue. The hydrocarbon residue can be saturated or unsaturated.

R is preferably a hydrocarbon residue having 1 to 6 C atoms. The curing rate of the composition can also be influenced by means of the length of the hydrocarbon residues which form the link between the polymer skeleton and silyl residue. More preferably, R is a methylene, ethylene or n-propylene residue. Methylene and n-propylene residues are particularly preferably used. Alkoxysilane-terminated compounds with a methylene group as a link to the polymer skeleton—so-called α-silanes—have a particularly high reactivity of the terminal silyl group, resulting in shorter setting times and thus a very rapid curing of formulations based on such polymers.

In general, an extension of the connecting hydrocarbon chain leads to a reduced reactivity of the polymers. In particular, the γ-silanes—they contain the unbranched propylene group as a link—have a balanced ratio between necessary reactivity (acceptable curing times) and delayed curing (open assembly time, possibility of correction after bonding). By means of a deliberate combining of α- and γ-alkoxysilane-terminated building blocks, the cure rate of the systems can thus be influenced as desired.

X, Y and Z are, independently of one another, $C_1$-$C_8$ alkyl residues, $C_1$-$C_8$ alkoxy residues or $C_1$-$C_8$ acyloxy residues. At least one of the residues X, Y, Z here must be a hydrolyzable group, i.e. a $C_1$-$C_8$ alkoxy residue or a $C_1$-$C_8$ acyloxy residue. Alkoxy groups, in particular methoxy, ethoxy, propyloxy and butyloxy groups, are preferably selected as hydrolyzable groups. This is advantageous because, during the curing of alkoxy group-containing compositions, no substances that irritate the mucous membranes are released. The alcohols formed are harmless in the quantities released and evaporate. Therefore, such compositions are particularly suitable for the DIY sector. As hydrolyzable groups, however, acyloxy groups, such as e.g. an acetoxy group —O—CO—$CH_3$, can also be used.

The alkoxy- and/or acyloxysilane-terminated polyether(s) and/or polyacrylic acid ester(s) of formula (I) preferably has/have at least two end groups of the general formula (I). Each polymer chain thus contains at least two linking sites at which the condensation of the polymers can take place with elimination of the hydrolyzed residues in the presence of atmospheric humidity. In this way, a regular and rapid crosslinkability is achieved and so bonds with good strengths can be obtained. Furthermore, by means of the quantity and structure of the hydrolyzable groups—e.g. the use of di- or trialkoxysilyl groups, methoxy groups or longer residues, etc.—the configuration of the network that can be achieved as a long-chain system (thermoplastics), relatively wide-meshed three-dimensional network (elastomers) or highly crosslinked system (thermosets) can be controlled, so that in this way, inter alia, the elasticity, flexibility and heat resistance of the finished crosslinked compositions can be influenced.

Preferably, X is an alkyl group and Y and Z are each an alkoxy group, or X, Y and Z are each an alkoxy group. Generally, polymers that contain di- or trialkoxysilyl groups have highly reactive linking sites, which make rapid curing, high degrees of crosslinking and thus good final strengths possible. The particular advantage of dialkoxysilyl groups lies in the fact that the corresponding compositions are more elastic, softer and more flexible after curing than systems containing trialkoxysilyl groups. They are therefore particularly suitable for use as sealants. In addition, they eliminate even less alcohol during curing and are therefore of particular interest when the quantity of alcohol released has to be reduced.

With trialkoxysilyl groups, on the other hand, a higher degree of crosslinking can be achieved, which is particularly advantageous if, after curing, a harder, stronger material is desired. In addition, trialkoxysilyl groups are more reactive and so they crosslink more rapidly and thus reduce the required quantity of catalyst, and they have advantages in "cold flow"—the dimensional stability of a corresponding adhesive under the influence of force and possibly the action of temperature.

Particularly preferably, X, Y and Z are, each independently of one another, a methyl, ethyl, methoxy or ethoxy group. Methoxy and ethoxy groups, as comparatively small hydrolyzable groups with low steric bulk, are very reactive and thus enable a rapid cure even with low use of catalyst. They are therefore of particular interest for systems in which a rapid cure is desired, such as e.g. in adhesives requiring high initial adhesion.

Particularly preferably, X, Y and Z are a methyl or a methoxy group. Compounds with alkoxysilyl groups have different reactivities in chemical reactions, depending on the nature of the alkyl groups at the oxygen atom. The methoxy group displays the greatest reactivity among the alkoxy groups. Silyl groups of this type can therefore be used when a particularly rapid cure is desired. Higher aliphatic residues, such as ethoxy, already bring about lower reactivity of the terminal alkoxysilyl group compared with methoxy groups and can advantageously be used to develop gradual crosslinking rates.

Interesting design possibilities are also opened up by combinations of the two groups. If, for example, methoxy is selected for X and ethoxy for Y within the same alkoxysilyl group, the desired reactivity of the terminal silyl groups can be adjusted particularly finely if exclusively methoxy-bearing silyl groups are considered too reactive and ethoxy-bearing silyl groups too unreactive for the intended use.

In addition to methoxy and ethoxy groups, larger residues can of course also be used as hydrolyzable groups, which naturally have lower reactivity. This is of particular interest if delayed curing is also to be achieved through the configuration of the alkoxy groups.

The curable composition according to the invention contains as component b) at least one organotin compound. Component b) is added to the composition in particular as a crosslinking catalyst. Suitable tin organyls are, for example, the 1,3-dicarbonyl compounds of di- or tetravalent tin, for example the acetylacetonates such as di(n-butyl)tin(IV) di(acetylacetonate), di(n-octyl)tin(IV) di(acetylacetonate), (n-octyl)(n-butyl)tin(IV) di(acetylacetonate); dialkyltin(IV) dicarboxylates, for example di-n-butyltin dilaurate, di-n-butyltin maleate, di-n-butyltin diacetate, di-n-octyltin diacetate or the corresponding dialkoxylates, for example, di-n-butyltin dimethoxide; and tin(II) carboxylates such as tin(II) octoate and tin(II) phenolate.

Also suitable are, for example, the following tin compounds: ethyl silicate, dimethyl maleate, diethyl maleate, dioctyl maleate, dimethyl phthalate, diethyl phthalate, dioctyl phthalate, di(n-butyl)tin(IV) di(methyl maleate), di(n-butyl) tin(IV) di(butyl maleate), di(n-octyl)tin(IV) di(methyl maleate), di(n-octyl)tin(IV) di(butyl maleate), di(n-octyl)tin(IV) di(isooctyl maleate), di(n-butyl)tin(IV) sulfide, di(n-butyl)tin (IV) oxide, di(n-octyl)tin(IV) oxide, (n-butyl)$_2$Sn (SCH$_2$COO), (n-octyl)$_2$Sn (SCH$_2$ COO), (n-octyl)$_2$Sn(SCH$_2$ CH$_2$COO), (n-octyl)$_2$ Sn(SCH$_2$CH$_2$ COOCH$_2$ CH$_2$OCOCH$_2$S), (n-butyl)$_2$Sn(SCH$_2$COO-i-C$_8$H$_{17}$)$_2$, (n-octyl)$_2$ Sn(SCH$_2$COO-i-C$_8$H$_{17}$)$_2$, (n-octyl)$_2$Sn(SCH$_2$COO-n-C$_8$H$_{17}$)$_2$. Particularly preferably, component b) is a dialkyltin (IV) dicarboxylate, in particular di-n-butyltin dilaurate. Component b) is used preferably in a quantity of 0.01 to 10 wt. %, based on the total weight of the composition. It is also possible to use mixtures of several catalysts to combine advantageous effects.

As component c), the composition according to the invention contains at least one compound which is free from tin and silicon atoms and has at least two functions that are each selected from: carboxy groups, carbonyl groups, hydroxy groups and nitrogen atoms which are part of a ring system that is aromatic in nature. Carboxy groups here are understood as functionalities of the structure —COOH, hydroxy groups as functionalities of the structure —OH and carbonyl groups as functionalities of the structure C=O. The at least two functions or functional groups can, in principle, be the same or different. Preferably, at least one compound of component c) has at least two different functions which are each selected from carboxy groups, carbonyl groups, hydroxy groups and nitrogen atoms which are part of a ring system that is aromatic in nature. The above-mentioned carboxy groups, carbonyl groups and hydroxy groups of component c) are regarded in the context of the present invention as isolated functional groups and are not present as part of more complex functional groups. For example, a compound which has only one carboxy group is not regarded as a component c), although the carboxy group contains both a carbonyl group and a hydroxy group. Nor are, for example, carbonyl groups that form part of ester groups (—COOR) regarded as carbonyl groups within the meaning of component c). In the case of nitrogen atoms as part of a ring system that is aromatic in nature, only the nitrogen atoms themselves are regarded as a functional group and not the entire aromatic system. It is therefore quite possible for a further functional group of component c), for example an OH group, to be located at another point in the ring system that is aromatic in nature.

Suitable as the compound of component c) are, for example, β-dicarbonyl compounds, such as 2,4-pentanedione, 1,1,1-trifluoro-2,4-pentanedione, 1,1,1,5,5,5-hexafluoro-2,4-pentanedione, 2,4-hexanedione, 2,4-pentanedione, 5-methyl-2,4-hexanedione, 2,4-octanedione, 5,5-dimethyl-2,4-hexanedione, 3-ethyl-2,4-pentanedione, 2,4-decanedione, 2,2-dimethyl-3,5-nonanedione, 3-methyl-2,4-pentanedione, 2,4-tridecanedione, 1-cyclohexyl-1,3-butanedione, 5,5-dimethyl-1,3-cyclohexanedione, 1,3-cyclohexanedione, 1-phenyl-1,3-butanedione, 1-(4-biphenyl)-1,3-butanedione, 1-phenyl-1,3-pentanedione, 3-benzyl-2,4-pentanedione, 1-phenyl-5,5-dimethyl-2,4-hexanedione, 1-phenyl-2-butyl-1,3-butanedione, 1-phenyl-3,3-(2-methoxy-phenyl)-1,3-propanedione, 1-(4-nitrophenyl)-1, 3-butanedione, 1-(2-furyl)-1,3-butanedione, 1-(tetrahydro-2-furyl)-1,3-butanedione, dimedone and dibenzoylmethane.

Another group of compounds which are suitable as component c) is formed by α-hydroxy ketones, such as benzoin, acetoin and α-hydroxyacetophenone, and α-hydroxycarboxylic acids, such as mandelic acid, lactic acid, citric acid, hydroxysuccinic acid, ascorbic acid and tartaric acid, with lactic acid being particularly preferred. Furthermore, fused aromatic β-hydroxy ketones, such as e.g. naphthazarin, 1-hydroxy-9-fluorenone or 1-hydroxyanthraquinone, are suitable.

Nitrogen atoms which are part of a ring system that is aromatic in nature are understood to be nitrogen atoms which are present in addition to carbon atoms as a ring-forming atom in at least monocyclic structures which exhibit aromaticity, i.e. have an arrangement of π electrons corresponding to Hückel's rule. Within the framework of the present invention, in this context at least mono-substituted nitrogen-containing heteroaromatics and among these in particular fused systems are suitable as component c), for example 8-hydroxyquinolines, 2-hydroxyquinolines, 7-hydroxy-3H-indoles, 8-hydroxyquinoxalines, 8-hydroxyquinazolines, 8-hydroxycinnolines, 4-hydroxyphenanthridines, 4-hydroxyacridines and 1-hydroxyphenazines, each capable of having further substituents, for example halogen atoms or alkyl groups.

The compositions according to the invention thus have at least one organotin compound and at least one compound of type c). Such a combination results in a delayed curing of the composition according to the invention. This gives the consumer the opportunity of carrying out corrections, for example moving the substrates relative to one another until the desired positions are achieved, even after application and pressing together the substrates to be bonded. Particularly preferably, the curable composition according to the invention comprises as component c) compounds which, as bidentate and polydentate ligands, are capable of forming complexes, in particular chelate complexes, with the compound(s) of component b).

Preferably, at least one of the functions of at least one compound of component c) has at least one oxygen atom, and at least one other function has at least one nitrogen atom which is part of a ring system that is aromatic in nature, or at least two functions of a compound of component c) each have at least one oxygen atom, wherein at least one carbon atom directly bonded to this oxygen atom has a different oxidation state from at least one carbon atom of the second function directly bonded to this oxygen atom. Particularly suitable in this sense are, for example, β-hydroxy ketones or α-hydroxycarboxylic acids.

Particularly preferably, component c) encompasses at least one N-heteroaromatic compound or α-hydroxycarboxylic acid, in particular 8-hydroxyquinoline or lactic acid. The preferred mole ratio (mol/mol) of the total quantity of compound(s) of component c) to the total quantity of the compound(s) of component b) is 1:10 to 10:1, particularly preferably 1:5 to 5:1, in particular 1:4 to 4:1 and most particularly preferably 1:3 to 3:1. The proportion by weight of the sum of components b) and c) in the composition according to the invention is preferably up to 5 wt. %, in particular up to 3 wt. % and most particularly preferably up to 2 wt. %, based in each case on the total weight of the composition.

The compositions according to the invention, which are suitable as adhesives, sealants or coating compositions, optionally also contain in addition to the aforementioned components a), b) and c) further auxiliary substances and additives which provide them with, for example, improved elastic properties, improved resilience and low residual tack. These auxiliary substances and additives include adhesion promoters, plasticizers and fillers. In addition, as further additives, the compositions can contain stabilizers, antioxidants, reactive diluents, drying agents, UV stabilizers, anti-ageing agents, rheological auxiliaries, pigments or pigment pastes, fungicides, flame retardants and/or optionally also to a small extent solvents.

A plasticizer is understood to be a substance that reduces the viscosity of the compositions and thus facilitates their processability and in addition improves flexibility and extensibility of the compositions.

The plasticizer is preferably selected from a fatty acid ester, a dicarboxylic acid ester, an ester of OH group-carrying or epoxidized fatty acids, a fat, a glycolic acid ester, a phthalic acid ester, a benzoic acid ester, a phosphoric acid ester, a sulfonic acid ester, a trimellitic acid ester, an epoxidized plasticizer, a polyether plasticizer, a polystyrene, a hydrocarbon plasticizer and a chlorinated paraffin, and mixtures of two or more thereof. By careful selection of one of these plasticizers or a specific combination, further advantageous properties of the composition according to the invention, e.g. gelling power of polymers, low-temperature elasticity and low-temperature resistance or antistatic properties, can be achieved.

For example, from the group of the phthalic acid esters, dioctyl phthalate, dibutyl phthalate, diisoundecyl phthalate, diisononyl phthalate or butyl benzyl phthalate, from the adipates, dioctyl adipate or diisodecyl adipate, and also diisodecyl succinate, dibutyl sebacate or butyl oleate are suitable. Of the polyether plasticizers, preferably end-capped polyethylene glycols are used, e.g. polyethylene or polypropylene glycol di-$C_{1-4}$-alkyl ethers, in particular the dimethyl or diethyl ethers of diethylene glycol or dipropylene glycol, and mixtures of two or more thereof. Also suitable as plasticizers are, for example, esters of abietic acid, butyric acid esters, acetic acid esters, propionic acid esters, thiobutyric acid esters, citric acid esters, and esters based on nitrocellulose and polyvinyl acetate, and mixtures of two or more thereof. Suitable examples also include the asymmetric esters of adipic acid monooctyl ester with 2-ethylhexanol (Edenol DOA, Cognis Deutschland GmbH, Düsseldorf). In addition, suitable as plasticizers are pure or mixed ethers of monofunctional, linear or branched $C_{4-16}$ alcohols or mixtures of two or more different ethers of such alcohols, for example dioctyl ether (available as Cetiol OE, Cognis Deutschland GmbH, Düsseldorf). Also suitable as plasticizers within the framework of the present invention are diurethanes, which can be produced for example by reaction of diols having terminal OH groups with monofunctional isocyanates, selecting the stoichiometry such that substantially all of the free OH groups react fully. Any excess isocyanate can then be removed from the reaction mixture, for example by distillation. Another method for the preparation of diurethanes consists in the reaction of monofunctional alcohols with diisocyanates, wherein as far as possible all of the NCO groups react fully.

A viscosity of the composition according to the invention that is too high for certain applications can also be reduced in a simple and expedient manner by using a reactive diluent, without the occurrence of separation phenomena (e.g. migration of plasticizer) in the cured material. Preferably, the reactive diluent has at least one functional group which reacts after application, for example with moisture or atmospheric oxygen. Examples of such groups are silyl groups, isocyanate groups, vinylically unsaturated groups and polyunsaturated systems. As a reactive diluent it is possible to use any compounds that are miscible with the composition according to the invention with a reduction of the viscosity and that have at least one group that is reactive with the binder, individually or as a combination of several compounds. The viscosity of the reactive diluent is preferably less than 20,000 mPas, particularly preferably about 0.1-6,000 mPas, most particularly preferably 1-1000 mPas (Brookfield RVT, 23° C., spindle 7, 10 rpm).

As a reactive diluent, it is possible to use e.g. the following substances: polyalkylene glycols reacted with isocyanatosilanes (e.g. Synalox 100-50B, DOW), alkyltrimethoxysilane, alkyltriethoxysilane, such as methyltrimethoxysilane, methyltriethoxysilane and vinyltrimethoxysilane (XL 10, Wacker), phenyltrimethoxysilane, phenyltriethoxysilane, octyltrimethoxysilane, tetraethoxysilane, vinyldimethoxymethylsilane (XL12, Wacker), vinyltriethoxysilane (GF56, Wacker), vinyltriacetoxysilane (GF62, Wacker), isooctyltrimethoxysilane (IO Trimethoxy) isooctyltriethoxysilane (IO Triethoxy, Wacker), N-trimethoxysilylmethyl-O-methylcarbamate (XL63, Wacker), N-dinnethoxy(methypsilylmethyl-O-methylcarbamate (XL65, Wacker), hexadecyltrimethoxysilane, 3-octanoylthio-1-propyltriethoxysilane and partial hydrolyzates of these compounds. Furthermore, the following polymers from Kaneka Corp. can also be used as reactive diluents: MS S203H, MS S303H, MS SAT 010 and MS SAX 350. Also suitable as reactive diluent are polymers that can be made from an organic backbone by grafting with a vinylsilane or by reacting polyol, polyisocyanate and alkoxysilane.

A polyol is understood to mean a compound having one or more OH groups in the molecule. The OH groups can be both primary and secondary.

Suitable aliphatic alcohols include, for example, ethylene glycol, propylene glycol and higher glycols, and other polyfunctional alcohols. The polyols can additionally contain other functional groups, such as e.g. esters, carbonates and amides. For the preparation of a reactive diluent by reacting polyol with polyisocyanate and alkoxysilane, the corresponding polyol component is reacted in each case with an at least difunctional isocyanate. As the at least difunctional isocyanate, in principle any isocyanate having at least two isocyanate groups is suitable; however, within the framework of the present invention, compounds having two to four isocyanate groups, especially having two isocyanate groups, are generally preferred.

Among the alkoxysilyl groups, the di- and preferably trialkoxysilyl groups are preferred.

Suitable polyisocyanates for the preparation of a reactive diluent are, for example, ethylene diisocyanate, 1,4-tetramethylene diisocyanate, 1,4-tetramethoxybutane diisocyanate, 1,6-hexamethylene diisocyanate (HDI), cyclobutane 1,3-diisocyanate, cyclohexane 1,3- and 1,4-diisocyanate, bis(2-isocyanatoethyl) fumarate and mixtures of two or more thereof, 1-isocyanato-3,3,5-trimethyl-5-isocyanatomethylcyclohexane (isophorone diisocyanate, IPDI), 2,4- and 2,6-hexahydrotoluene diisocyanate, hexahydro-1,3- or 1,4-phenylene diisocyanate, benzidine diisocyanate, naphthalene-1,5-diisocyanate, 1,6-diisocyanato-2,2,4-trimethylhexane, 1,6-diisocyanato-2,4,4-trimethylhexane, xylylene diisocyanate (XDI), tetramethylxylylene diisocyanate (TMXDI), 1,3- and 1,4-phenylene diisocyanate, 2,4- or 2,6-toluene diisocyanate (TDI), 2,4'-diphenylmethane diisocyanate, 2,2'-diphenylmethane diisocyanate or 4,4'-diphenylmethane diisocyanate (MDI) or partially or fully hydrogenated cycloalkyl derivatives thereof, e.g. fully hydrogenated MDI (H12 MDI), alkyl-substituted diphenylmethane diisocyanates, for example mono-, di-, tri- or tetraalkyldiphenylmethane diisocyanate and partially or fully hydrogenated cycloalkyl derivatives thereof, 4,4'-diisocyanatophenyl perfluoroethane, bisisocyanatoethyl phthalate, 1-chloromethylphenyl-2,4- or -2,6-diisocyanate, 1-bromomethylphenyl-2,4- or -2,6-diisocyanate, 3,3-bischloromethyl ether-4,4'-diphenyl diisocyanate, sulfur-containing diisocyanates, such as are obtainable by reacting 2 moles of diisocyanate with 1 mole of thiodiglycol or dihydroxydihexyl sulfide, the di- and triisocyanates of dimer and trimer fatty acids or mixtures of two or more of these diisocyanates.

Likewise, it is possible to use tri- or higher functional isocyanates as polyisocyanates, such as are obtainable by oligomerization of diisocyanates, in particular by oligomerization of the above-mentioned isocyanates. Examples of these tri- and higher functional polyisocyanates are the triisocyanurates of HDI or IPDI or mixtures thereof or mixed triisocyanurates thereof and polyphenylmethylene polyisocyanate, as is obtainable by phosgenation of aniline-formaldehyde condensation products.

To reduce the viscosity of the composition according to the invention, in addition to or instead of a reactive diluent, solvents can also be used. Suitable solvents are aliphatic or aromatic hydrocarbons, halogenated hydrocarbons, alcohols, ketones, ethers, esters, ester alcohols, keto alcohols, keto ethers, keto esters and ether esters. Preferably, however, alcohols are used, since in this case storage stability is increased. $C_1$-$C_{10}$ alcohols, particularly methanol, ethanol, isopropanol, isoamyl alcohol and hexanol, are particularly preferred.

The composition according to the invention can also comprise an adhesion promoter. An adhesion promoter is understood to mean a substance that improves the adhesion properties of adhesive layers on surfaces. Conventional adhesion promoters (tackifiers) known to the person skilled in the art can be used individually or as a combination of several compounds. Suitable examples include resins, terpene oligomers, coumarone/indene resins, aliphatic petrochemical resins and modified phenolic resins. Suitable within the framework of the present invention are, for example, hydrocarbon resins, as obtained by polymerization of terpenes, mainly α- or β-pinene, dipentene or limonene. Polymerization of these monomers is usually cationic with initiation using Friedel-Crafts catalysts. The terpene resins also include copolymers of terpenes and other monomers, such as styrene, α-methylstyrene, isoprene and the like. The above-mentioned resins are used, for example, as adhesion promoters for pressure-sensitive adhesives and coating materials. Also suitable are the terpene phenolic resins, which are produced by acid-catalyzed addition of phenols to terpenes or rosin. Terpene phenolic resins are soluble in most organic solvents and oils and miscible with other resins, waxes and rubber. Also suitable as adhesion promoters within the framework of the present invention in the above sense are the rosins and their derivatives, such as esters or alcohols thereof. Particularly suitable are silane adhesion promoters, in particular aminosilanes.

In a specific embodiment of the curable composition according to the invention, the composition comprises a silane of the general formula (II)

as an adhesion promoter, in which
R' and R" are, independently of one another, hydrogen or $C_1$-$C_8$ alkyl residues,
R is a divalent hydrocarbon residue having 1-12 C atoms optionally containing a heteroatom, and
X, Y, Z are, independently of one another, $C_1$-$C_8$ alkyl, $C_1$-$C_8$ alkoxy or $C_1$-$C_8$ acyloxy residues, at least one of the residues being a $C_1$-$C_8$ alkoxy or $C_1$-$C_8$ acyloxy group. Such compounds inherently exhibit a high affinity to the binding polymer components of the curable composition according to the invention, but also to a wide range of polar and nonpolar surfaces and therefore contribute to the formation of particularly stable adhesion between the adhesive composition and the substrates to be bonded in each case.

The linking group R can be, for example, a straight-chained or branched or cyclic, substituted or unsubstituted alkylene residue. As a heteroatom, nitrogen (N) or oxygen (O) is optionally contained therein. If X, Y and/or Z are an acyloxy group, this can be, for example, the acetoxy group —OCO—$CH_3$.

Suitable fillers for the composition according to the invention are, for example, chalk, lime powder, precipitated and/or pyrogenic silica, zeolites, bentonites, magnesium carbonate, kieselguhr, alumina, clay, tallow, titanium oxide, iron oxide, zinc oxide, sand, quartz, flint, mica, glass powder and other ground minerals. In addition, organic fillers, especially carbon black, graphite, wood fibers, wood flour, sawdust, wood pulp, cotton, pulp, wood chips, chopped straw, chaff, ground walnut shells and other chopped fibers, can also be used. Furthermore, short fibers such as glass fiber, glass filament, polyacrylonitrile, carbon fiber, Kevlar fiber or polyethylene fibers can also be added. Aluminum powder is also suitable as a filler. In addition, hollow spheres with a mineral shell or a plastic shell are suitable as fillers. These can be, for example, hollow glass spheres, which are commercially available with the trade names Glass Bubbles®. Hollow spheres based on plastics, e.g. Expancel® or Dualite®, are described e.g. in EP 0 520 426 B1. These are composed of inorganic or organic substances, each having a diameter of 1 mm or less, preferably of 500 μm or less. For some applications, fillers which impart thixotropy to the preparations are preferred. Such fillers are also described as rheological auxiliaries, e.g. hydrogenated castor oil, fatty acid amides or swellable plastics such as PVC. So that they can be pressed out readily from a suitable metering device (e.g. tube), such preparations have a viscosity of 3,000 to 15,000, preferably 4,000 to 8,000 mPas or 5,000 to 6,000 mPas.

The fillers are preferably used in a quantity of 1 to 80 wt. %, based on the total weight of the composition. A single filler or a combination of several fillers can be used.

In a preferred embodiment of the composition according to the invention, the filler is a highly dispersed silica having a BET surface area of 10 to 90 $m^2$/g, in particular from 35 to 65 $m^2$/g. When a silica of this type is used, it does not cause a substantial increase in the viscosity of the composition according to the invention but contributes to a reinforcement of the cured composition. By means of this reinforcement, for example, the initial strengths, shear strengths and the adhesion of the adhesives, sealants or coating compositions in which the composition according to the invention is used are improved.

Particularly preferably, a highly dispersed silica having a BET surface area of 45 to 55 $m^2$/g, in particular having a BET surface area of about 50 $m^2$/g, is used. Such silicas have the added advantage of a 30 to 50% shorter incorporation time in comparison to silicas with a higher BET surface area Another advantage lies in the fact that the said highly dispersed silica can be incorporated into silane-terminated adhesives, sealants or coating compositions at a considerably higher concentration without the transparency and the flow properties of the adhesives, sealants or coating compositions being impaired. Particular preference is also given to an embodiment of the composition according to the invention in which the filler is a highly dispersed silica with a mean particle size $d_{50}$, measured by laser diffraction, of less than 25 μm, preferably from 5 to 20 μm. A filler of this type is especially suitable where highly transparent, clear compositions are needed for particularly demanding applications. It is also conceivable to use pyrogenic and/or precipitated silicas with a relatively high BET surface area, advantageously with 100-250 $m^2$/g, in particular 110-170 $m^2$/g, as a filler. The incorporation of such silicas, however, takes a comparatively long time and is therefore more costly. In addition, significant quantities of air are introduced into the product, which has to be removed again in a complicated and time-consuming manner. On the other hand, the effect of a reinforcement of the cured composition due to the higher BET surface area can be achieved with a smaller proportion by weight of silica. In this way, additional substances can be introduced to improve the preparation according to the invention with regard to other requirements.

In the event that a basic filler is to be used instead of acidic fillers, for example calcium carbonates (chalks) are suitable, in which case cubic, non-cubic, amorphous and other modifications can be used. Preferably, the chalks used are surface treated or coated. As a coating agent, preferably fatty acids, fatty acid soaps and fatty acid esters are used, for example lauric acid, palmitic acid or stearic acid, sodium or potassium salts of such acids or their alkyl esters. In addition, however, other surface-active substances, such as sulfate esters of long-chain alcohols or alkylbenzenesulfonic acids or their sodium or potassium salts or coupling reagents based on silanes or titanates, are also suitable. The surface treatment of chalks is often associated with an improvement in processability and adhesive strength and also the weathering resistance of the compositions. The coating composition is usually used in a proportion of 0.1 to 20 wt %, preferably 1 to 5 wt %, based on the total weight of the crude chalk.

Depending on the desired property profile, precipitated or ground chalks can be used. Ground chalks can be produced, for example, from natural lime, limestone or marble by mechanical grinding, using either dry or wet methods. Depending on the grinding process, fractions having different average particle sizes can be obtained. Advantageous specific surface area values (BET) are between 1.5 $m^2/g$ and 50 $m^2/g$.

Furthermore, the composition according to the invention can contain antioxidants. Preferably, the proportion of the antioxidants in the composition according to the invention is up to about 7 wt. %, in particular up to about 5 wt. %, based on the total weight of the composition. The composition according to the invention can additionally contain UV stabilizers. Preferably, the proportion of the UV stabilizers in the composition according to the invention is up to about 2 wt. %, in particular about 1 wt. %. Particularly suitable as UV stabilizers are the so-called hindered amine light stabilizers (HALS). It is preferred within the framework of the present invention if a UV stabilizer is used which carries a silyl group and is incorporated into the end product during crosslinking or curing. The products Lowilite 75 and Lowilite 77 (Great Lakes, USA) are particularly suitable for this purpose. Furthermore, benzotriazoles, benzophenones, benzoates, cyanoacrylates, acrylates, sterically hindered phenols, phosphorus and/or sulfur can also be added.

It is often useful to stabilize the compositions according to the invention further against moisture penetration in order to increase the shelf life even more. Such an improvement in shelf life can be achieved, for example, by the use of drying agents. Suitable as drying agent are all compounds that react with water to form a group that is inert towards the reactive groups present in the composition while undergoing the smallest possible changes in their molecular weight. Furthermore, the reactivity of the drying agents towards moisture that has penetrated into the composition must be higher than the reactivity of the end groups of the silyl group-containing polymer present in the composition according to the invention. Isocyanates, for example, are suitable as drying agent.

Advantageously, silanes are also used as drying agent, e.g. vinylsilanes such as 3-vinylpropyltriethoxysilane, oxime silanes such as methyl-O,O',O"-butan-2-one-trioximosilane or O,O',O",O'"-butan-2-one-tetraoximosilane (CAS No. 022984-54-9 and 034206-40-1) or benzamidosilanes such as bis(N-methylbenzamido)methylethoxysilane (CAS No. 16230-35-6) or carbamatosilanes such as carbamatomethyl-trimethoxysilane. However, the use of methyl, ethyl or vinyl-trimethoxysilane, tetramethyl- or tetraethylethoxysilane is also possible. Particularly preferred here are vinyltrimethoxysilane and tetraethoxysilane in terms of efficiency and costs. Also suitable as drying agent are the above-mentioned reactive diluents, provided that they have a molecular weight ($M_n$) of less than about 5,000 g/mol and terminal groups whose reactivity with penetrating moisture is at least as great as, preferably greater than, the reactivity of the reactive groups of the silyl group-containing polymer according to the invention. Finally, alkyl orthoformates or orthoacetates can also be used as drying agent, for example methyl or ethyl orthoformate, or methyl or ethyl orthoacetate. The composition according to the invention generally contains about 0.01 to about 10 wt. % drying agent.

The composition according to the invention preferably contains

| | |
|---|---|
| 100 parts by weight | component a), |
| 0.5-25 parts by weight | adhesion promoter, |
| 0.01-10 parts by weight | component b), |
| 0.001-100 parts by weight | component c), and optionally |
| 0-125 parts by weight | plasticizer, |
| 0-125 parts by weight | filler, |
| 0-25 parts by weight | drying agents or water scavengers, |
| 0-10 parts by weight | further additives, such as pigments, stabilizers, UV absorbers, anti-ageing agents, antioxidants, rheological auxiliaries, diluents or reactive diluents and/or solvents, as well as fungicides and flame retardants. |

Compositions based on these proportional ratios make it possible to obtain readily processable adhesives, sealants or coating compositions which, in addition to very good elasticity values, exhibit good strength and adhesion. At the same time, the properties of the composition can be precisely tuned to the particular field of application by a specific weighting of the proportions.

The viscosity of the curable composition according to the invention is preferably less than 1,000,000 mPas (measured with a Brookfield viscometer type RVDVII+, no. 7 spindle, 10 rpm at 23° C.). Particularly preferably, the viscosity of the composition according to the invention is less than 500,000 mPas. In particular, the viscosity of the composition is less than 250,000 mPas. These viscosities allow good processability of the compositions.

The present invention also provides a method of producing a curable composition according to the invention, wherein at least
a) one polyether and/or at least one polyacrylic acid ester having at least one terminal group of the general formula (I)

$$-A_n-R-SiXYZ \qquad (I),$$ wherein

A is a divalent linking group,
R is a divalent hydrocarbon residue having 1-12 C atoms optionally containing a heteroatom, and
X, Y, Z are, independently of one another, $C_1$-$C_8$ alkyl, $C_1$-$C_8$ alkoxy or $C_1$-$C_8$ acyloxy residues, at least one of the residues being a $C_1$-$C_8$ alkoxy or $C_1$-$C_8$ acyloxy group, and
n is 0 or 1;

b) one organotin compound;

c) one compound which is free from tin and silicon atoms and which has at least two functions that are each selected from: carboxy groups, carbonyl groups, hydroxy groups and nitrogen atoms which are part of a ring system that is aromatic in nature, and optionally an adhesion promoter, are mixed together.

The present invention also provides the use of a curable composition according to the invention, or of a curable composition produced by the method according to the invention, as an adhesive, sealant or coating composition, particularly as an adhesive for bonding plastics, metals, glass, ceramics, wood, timber-based materials, paper, paper materials, rubber and textiles.

In principle in the present invention, all features listed within the framework of the present text, particularly the embodiments, proportional ranges, components and other features of the composition according to the invention, of the method according to the invention and of the use according to the invention identified as preferred and/or special, can be implemented in all possible and not mutually exclusive combinations, with combinations of features identified as preferred and/or special also being regarded as preferred and/or special.

EXAMPLES

1. Production of a Silane-Terminated Polyether of Component a)

328 g (28 mmol) of polypropylene glycol 12000 (hydroxyl number=9.6) were dried in a 500 ml reactor at 80° C. in vacuo. Under a nitrogen atmosphere at 80° C., 0.07 g bismuth(III) octanoate (BorchiKat 24) were added and then 14 g (67 mmol) isocyanatopropyltrimethoxysilane (% NCO=19.9) were added. After stirring for one hour at 80° C., the resulting polymer was cooled and 7.1 g vinyltrimethoxysilane and 5.3 g of a mixture of 70 wt. % bis(1,2,2,6,6-pentamethyl-4-piperidyl) sebacate and 30 wt. % methyl-1,2,2,6,6-pentamethyl-4-piperidyl sebacate (Tinuvin 765) were added. The product was stored in a moisture-tight manner under a nitrogen atmosphere in a glass vessel before being processed further into a curable composition.

2. Compositions and Properties

TABLE 1

Compositions and properties of silica formulations

| | Example No. | | |
|---|---|---|---|
| | 1 (comp.) | 2 | 3 |
| Composition (parts by weight) | | | |
| Polymer from 1 | 83.0 | 83.0 | 83.0 |
| Silica (Aerosil OX 50) | 10.0 | 10.0 | 10.0 |
| Aminopropyltrimethoxysilane (Geniosil GF 96) | 5.0 | 5.0 | 5.0 |
| Vinyltrimethoxysilane (Geniosil XL 10) | 2.0 | 2.0 | 2.0 |
| Dibutyltin dilaurate | 0.10 | 0.20 | 0.20 |

TABLE 1-continued

Compositions and properties of silica formulations

| | | Example No. | | |
|---|---|---|---|---|
| | | 1 (comp.) | 2 | 3 |
| Lactic acid | | | 0.05 | |
| Salicylic acid | | | | 0.1 |
| Properties | | | | |
| Skin Over Time (min) | | 9 | 18 | 13 |
| Tensile shear strengths on BP/BP after storage in standard conditioning atmosphere for | | | | |
| 0.5 h | N/mm$^2$ | 0.13 | 1.16 | 0.4 |
| 1.0 h | N/mm$^2$ | 0.7 | 1.53 | 0.9 |
| 2.0 h | N/mm$^2$ | 1.98 | 2.44 | 2.2 |
| 7 d | N/mm$^2$ | 4.63 | 4.71 | 4.6 |

BP = beech plywood

The examples show that the curing (skin over time) of the compositions according to the invention, despite double the content of curing catalyst (dibutyltin dilaurate), is significantly delayed compared to the composition of Example 1.

TABLE 2

Compositions and properties of chalk-containing formulations

| | Example No. | | | |
|---|---|---|---|---|
| | 4 (comp.) | 5 | 6 | 7 |
| Composition (parts by weight) | | | | |
| Polymer from 1 | 28.0 | 28.0 | 28.0 | 28.0 |
| Diundecyl phthalate | 12.5 | 12.5 | 12.5 | 12.5 |
| Calcium carbonate (Omyabond 302) | 57.0 | 57.0 | 57.0 | 57.0 |
| Aminopropyltrimethoxysilane (Geniosil GF 96) | 1.0 | 1.0 | 1.0 | 1.0 |
| Vinyltrimethoxysilane (Geniosil XL 10) | 1.4 | 1.4 | 1.4 | 1.4 |
| Dibutyltin dilaurate | 0.2 | 0.20 | 0.20 | 0.20 |
| 8-Hydroxyquinoline | | 0.015 | 0.044 | 0.131 |
| Properties | | | | |
| Skin Over Time (min) | 5 | 6 | 10 | 50 |
| Tensile shear strengths on BP/BP in N/mm$^2$ after storage in standard conditioning atmosphere for | | | | |
| 10 min | 0.59 | 0.6 | 0.16 | 0.2 |
| 30 min | 1.74 | 1.54 | 0.67 | 0.4 |
| 1 h | 2.42 | 2.3 | 1.5 | 0.7 |
| 2 h | 2.66 | 2.6 | 2.2 | 1 |
| 3 h | 2.97 | 2.89 | 2.5 | 1.3 |
| 4 h | 3.4 | 3.5 | 2.8 | 1.9 |
| 6 h | 3.6 | 3.6 | 3.2 | 2.5 |
| 8 h | 3.7 | 3.6 | 3.5 | 2.9 |

The examples show that the adhesive bonds produced with the compositions according to the invention exhibit a significantly longer processing time (skin over time) but then cure completely at an accelerated rate and achieve very good strength values within a short time, which are at the level of a composition without delayed curing.

The invention claimed is:

1. A curable composition comprising
   a) at least one polyether and/or at least one polyacrylic acid ester having at least one terminal group of the general formula (I)

-$A_n$-R—SiXYZ (I), in which

A is a divalent linking group,
   R is a divalent hydrocarbon residue having 1-12 C atoms optionally containing a heteroatom, and
   X, Y, Z are, independently of one another, $C_1$-$C_8$ alkyl, $C_1$-$C_8$ alkoxy or $C_1$-$C_8$ acyloxy residues, at least one of the residues being a $C_1$-$C_8$ alkoxy or $C_1$-$C_8$ acyloxy group, and
   n is 0 or 1; and
   b) at least one organotin compound,
   c) at least one compound which is free from tin and silicon atoms and has at least two functions that are each selected from: carboxy groups, carbonyl groups, hydroxy groups and nitrogen atoms which are part of a ring system that is aromatic in nature, wherein component c) comprises at least one N-heteroaromatic compound or α-hydroxycarboxylic acid, wherein the N-heteroaromatic compound is selected from 8-hydroxyquinolines, 2-hydroxyquinolines, 7-hydroxy-3H-indoles, 8-hydroxyquinoxalines, 8-hydroxyquinazolines, 8-hydroxycinnolines, 4-hydroxyphenanthridines, 4-hydroxyacridines and 1-hydroxyphenazines, each optionally comprising further substituents and the α-hydroxycarboxylic acid is lactic acid.

2. The curable composition according to claim 1, wherein the mole ratio (mol/mol) of the total quantity of compound(s) of component c) to the total quantity of the compound(s) of component b) is 1:10 to 10:1.

3. The curable composition according to claim 1, wherein component a) contains at least one polyether having a molecular weight $M_n$ of 4 000 to 100 000 g/mol.

4. The curable composition according to claim 1, wherein component a) contains at least one polyether having a terminal unsaturation of less than 0.07 meq/g, determined by the ASTM D4671 method.

5. The curable composition according to claim 1, wherein the composition comprises a silane of the general formula (II)

R'R"NR—SiXYZ (II)

as an adhesion promoter, in which
   R' and R" are, independently of one another, hydrogen or $C_1$-$C_8$ alkyl residues,
   R is a divalent hydrocarbon residue having 1-12 C atoms optionally containing a heteroatom, and
   X, Y, Z are, independently of one another, $C_1$-$C_8$ alkyl, $C_1$-$C_8$ alkoxy or $C_1$-$C_8$ acyloxy residues, at least one of the residues being a $C_1$-$C_8$ alkoxy or $C_1$-$C_8$ acyloxy group.

6. The curable composition according to claim 1, comprising
   100 parts by weight of component a),
   0.5-25 parts by weight of an adhesion promoter,
   0.01-10 parts by weight of component b),
   0.001-100 parts by weight of component c), and optionally
   0-125 parts by weight of a plasticizer,
   0-125 parts by weight of a filler,
   0-25 parts by weight of drying agents or water scavengers,
   0-10 parts by weight of further additives, such as pigments, stabilizers, UV absorbers, anti-ageing agents, antioxidants, rheological auxiliaries, diluents, reactive diluents, solvents, fungicides and/or flame retardants.

7. A method of producing a curable composition according to claim 1, comprising:
   providing a) one polyether and/or at least one polyacrylic acid ester having at least one terminal group of the general formula (I)

-$A_n$-R—SiXYZ (I), in which

A is a divalent linking group,
   R is a divalent hydrocarbon residue having 1-12 C atoms optionally containing a heteroatom, and
   X, Y, Z are, independently of one another, $C_1$-$C_8$ alkyl, $C_1$-$C_8$ alkoxy or $C_1$-$C_8$ acyloxy residues, at least one of the residues being a $C_1$-$C_8$ alkoxy or $C_1$-$C_8$ acyloxy group, and
   n is 0 or 1;
   providing b) one organotin compound;
   providing c) one compound which is free from tin and silicon atoms and which has at least two functions that are each selected from: carboxy groups, carbonyl groups, hydroxy groups and nitrogen atoms which are part of a ring system that is aromatic in nature, wherein the compound is at least one N-heteroaromatic compound or α-hydroxycarboxylic acid, wherein the N-heteroaromatic compound is selected from 8-hydroxyquinolines, 2-hydroxyquinolines, 7-hydroxy-3H-indoles, 8-hydroxyquinoxalines, 8-hydroxyquinazolines, 8-hydroxycinnolines, 4-hydroxyphenanthridines, 4-hydroxyacridines and 1-hydroxyphenazines, each optionally comprising further substituents and the α-hydroxycarboxylic acid includes lactic acid; and
   mixing a), b) and c) together.

8. An adhesive, sealant or coating composition comprising the curable composition according to claim 1.

9. An article comprising cured reaction product of the curable composition according to claim 1 bonded to a surface.

10. The curable composition of claim 1 wherein the α-hydroxycarboxylic acid further includes salicylic acid.

11. The curable composition of claim 1 wherein the N-heteroaromatic compounds is 8-hydroxyquinolines.

* * * * *